United States Patent Office.

FREDERICK RINDER, OF CHICAGO, ILLINOIS.

PROCESS OF SEPARATING GOLD AND SILVER.

SPECIFICATION forming part of Letters Patent No. 541,333, dated June 18, 1895.

Application filed June 5, 1894. Serial No. 513,536. (No specimens.)

*To all whom it may concern:*

Be it known that I, FREDERICK RINDER, of Chicago, in the county of Cook and State of Illinois, have invented a new and Improved Process of Separating Gold and Silver, of which the following is a full, clear, and exact description.

The invention relates to the "MacArthur-Forrest cyanide process," and its object is to provide a new and improved process for separating the gold and silver contained in the cyanide solution used by mills to extract gold and silver from the ores, so that the precious metals are separately obtained in a very simple and economical manner.

The improved process consists in subjecting the cyanide solution containing the gold and silver, to the action of chloride of zinc, to precipitate the metal. In the well known "MacArthur-Forrest cyanide process," the precious metals are contained in a cyanide solution (potassic auro-cyanide), which is run through a box filled with zinc shavings, to obtain the precious metals as an amalgam. In my process the cyanide solution is contained in a tank, and the chloride of zinc is dissolved in water, and the mixture well shaken is then poured into the solution drop by drop, so that the gold at once begins to separate from the cyanide of potassium, to be finally precipitated on the bottom of the tank as a grayish powder. The exhausted cyanide solution is then run into another tank, and the precipitate is collected from the bottom of the tank, dried, and finally melted into bullion.

The amount of chloride used is comparatively small, as a few ounces will be sufficient for obtaining the gold contained in a ton of ore, so that the process beside requiring but little attention and labor, is very economical on account of the low cost of the solvent employed.

In order to obtain gold and silver separately, the cyanide solution is first subjected to the action of a solution of sulphide of iron (or sodium sulphide) to separate the silver and precipitate the same on the bottom of the tank, after which the cyanide solution still containing the gold, is run off into a second tank and therein subjected to the action of chloride of zinc, to separate and precipitate the gold, as above described. By this arrangement silver and gold are separately obtained.

The exhausted cyanide solution is reinforced by the addition of the necessary amount of cyanide of potassium, to be then used over again by dissolving a new quantity of ore therein, to form the potassic auro-cyanide in solution to be treated as above described.

This process requires less cyanide of potassium than the above mentioned "MacArthur-Forrest cyanide process," as the cyanide solution in this latter process must pass over a great surface of zinc shavings, so that by the powerful action of the zinc upon the cyanide, the solution loses much of its strength. In my process the contact with metallic zinc is completely avoided and the solution retains more of its strength, and therefore less cyanide is necessary to be added to bring the solution up to the normal standard for reuse.

In filtering the cyanide solution through the shavings in the zinc box extra work is required, as the metallic powder has to be separated from the zinc shavings by vigorous washing and then collecting the shavings. In my process the precious metal is precipitated in a few minutes, so that the clear exhausted solution can be at once run off into another tank, and the precipitate is then dried and run into bullion as above described.

For wet assays in the laboratory my process enables the assayer to obtain his beat of silver and his beat of gold separately, by first precipitating the silver and then the gold as above described, and then he can mix each precipitate with a small amount of granulated lead, wrap the mixture in sheet lead, and then cupel the article in a boneash cupel. The result is a beat of silver and a beat of gold.

Beside being very simple, cheap and easily worked, my process admits of being readily adapted to mills as now constructed, so that gold and silver can be readily extracted with very little cost or change in machinery; all that is needed instead of the zinc box, being a tank wherein the silver may be precipitated and a second tank for precipitating the gold. The chloride of zinc used can be easily made at the mills, as zinc is cheap, and by being dissolved in dilute hydrochloric acid, the acid is evaporated and crystals of chloride are obtained which are dissolved in water to form the solution which precipitates the gold.

Having thus described my invention, I claim as new and desire to secure by Letters Patent—

1. The herein described process of separating gold and silver, which consists in first leaching the gold and silver ores with a cyanide solution, then precipitating the silver in the solution with sulphide of iron, and then precipitating the gold in the solution with chloride of zinc, substantially as described.

2. The herein-described process of separating gold and silver contained in cyanide solutions, consisting in subjecting the cyanide solution to the action of chloride of zinc, to separate the precious metal from the cyanide and to precipitate the metal, substantially as described.

3. The herein-described process of separating gold and silver contained in a cyanide solution, consisting in first subjecting the cyanide solution to the action of a solution of sulphide of iron, to separate and precipitate the silver, and then subjecting the cyanide solution, in a separate tank, to the action of chloride of zinc to separate and precipitate the gold, substantially as described.

FREDERICK RINDER.

Witnesses:
LOUIS APPEL,
AUGUST F. VOSS.